US006931486B2

(12) United States Patent
Cavallo et al.

(10) Patent No.: US 6,931,486 B2
(45) Date of Patent: Aug. 16, 2005

(54) METHOD AND APPARATUS FOR COALESCING TWO OR MORE TRANSACTING REQUESTS

(75) Inventors: Joseph S. Cavallo, Framingham, MA (US); Stephen J. Ippolito, Concord, MA (US)

(73) Assignee: Intel Corporation, Santa Clara, CA (US)

( * ) Notice: Subject to any disclaimer, the term of this patent is extended or adjusted under 35 U.S.C. 154(b) by 712 days.

(21) Appl. No.: 10/005,764

(22) Filed: Nov. 2, 2001

(65) Prior Publication Data

US 2003/0088734 A1 May 8, 2003

(51) Int. Cl.[7] .............................................. G06F 12/00
(52) U.S. Cl. ...................... 711/114; 711/169; 711/201
(58) Field of Search ................................ 711/114, 169, 711/201

(56) References Cited

U.S. PATENT DOCUMENTS 5,426,736 A * 6/1995 Guineau, III ................ 710/56

* cited by examiner

Primary Examiner—Reba I. Elmore
(74) Attorney, Agent, or Firm—Fish & Richardson P.C.

(57) ABSTRACT

A method of coalescing transfer requests, includes storing a transfer request on a pending list, determining that no previous transfer requests are being processed, combining at least two transfer requests as a combined data transfer and releasing the combined data transfer. The method may also include determining that the pending list is not empty before releasing the combined data transfer.

23 Claims, 4 Drawing Sheets

METHOD AND APPARATUS FOR COALESCING TWO OR MORE TRANSACTING REQUESTS

TECHNICAL FIELD

This invention relates to coalescing transaction requests.

BACKGROUND

Computer processing systems are typically connected to one or more input/output ("I/O") devices. The processor sends and receives data items to and from the I/O devices in a series of data transfers. The efficiency of performing data transfers affects the overall performance of the processing system.

DESCRIPTION

Figure 1A:
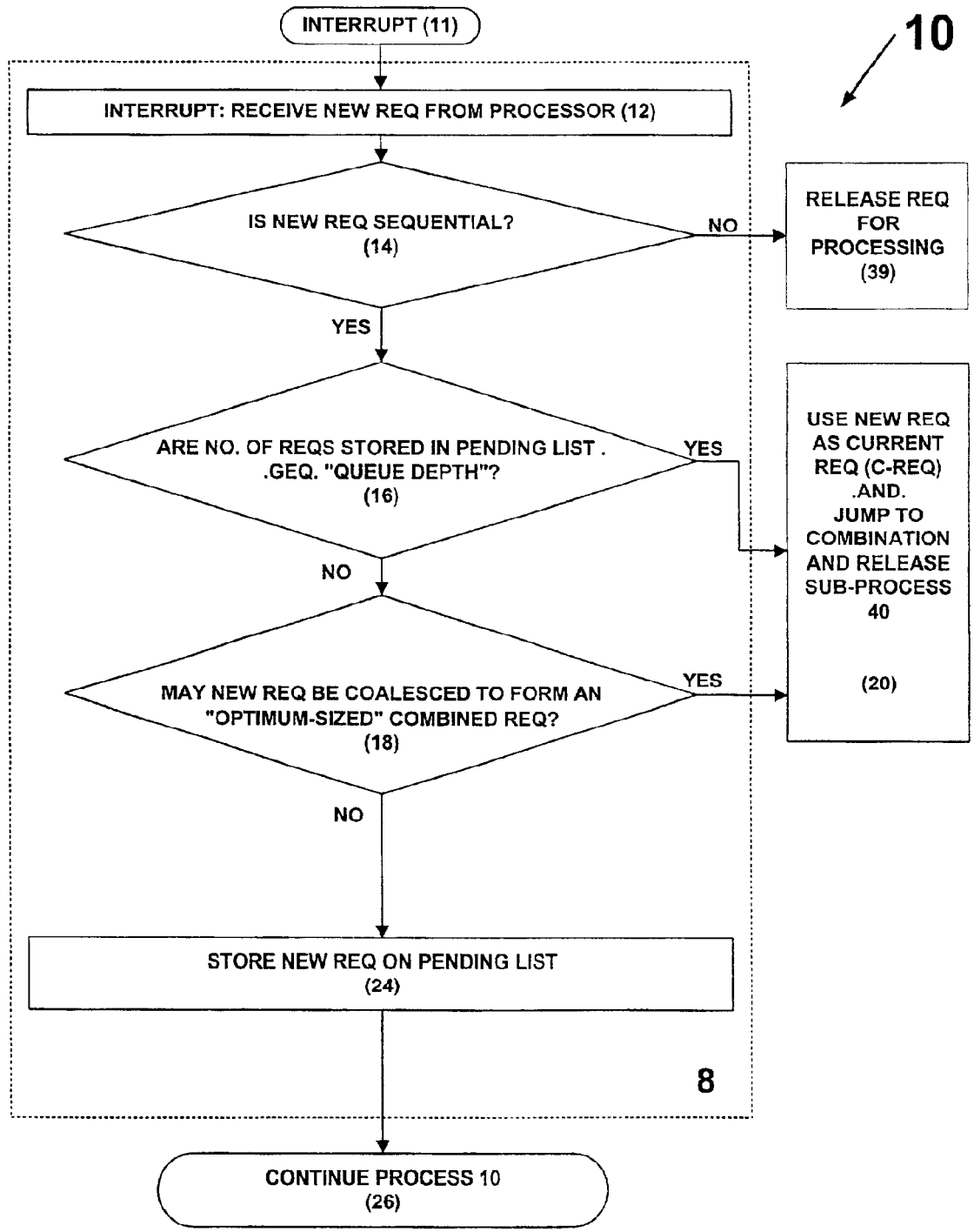
FIGS. 1a and 1b are flowcharts showing a transaction request coalescing process.
Figure 1B:
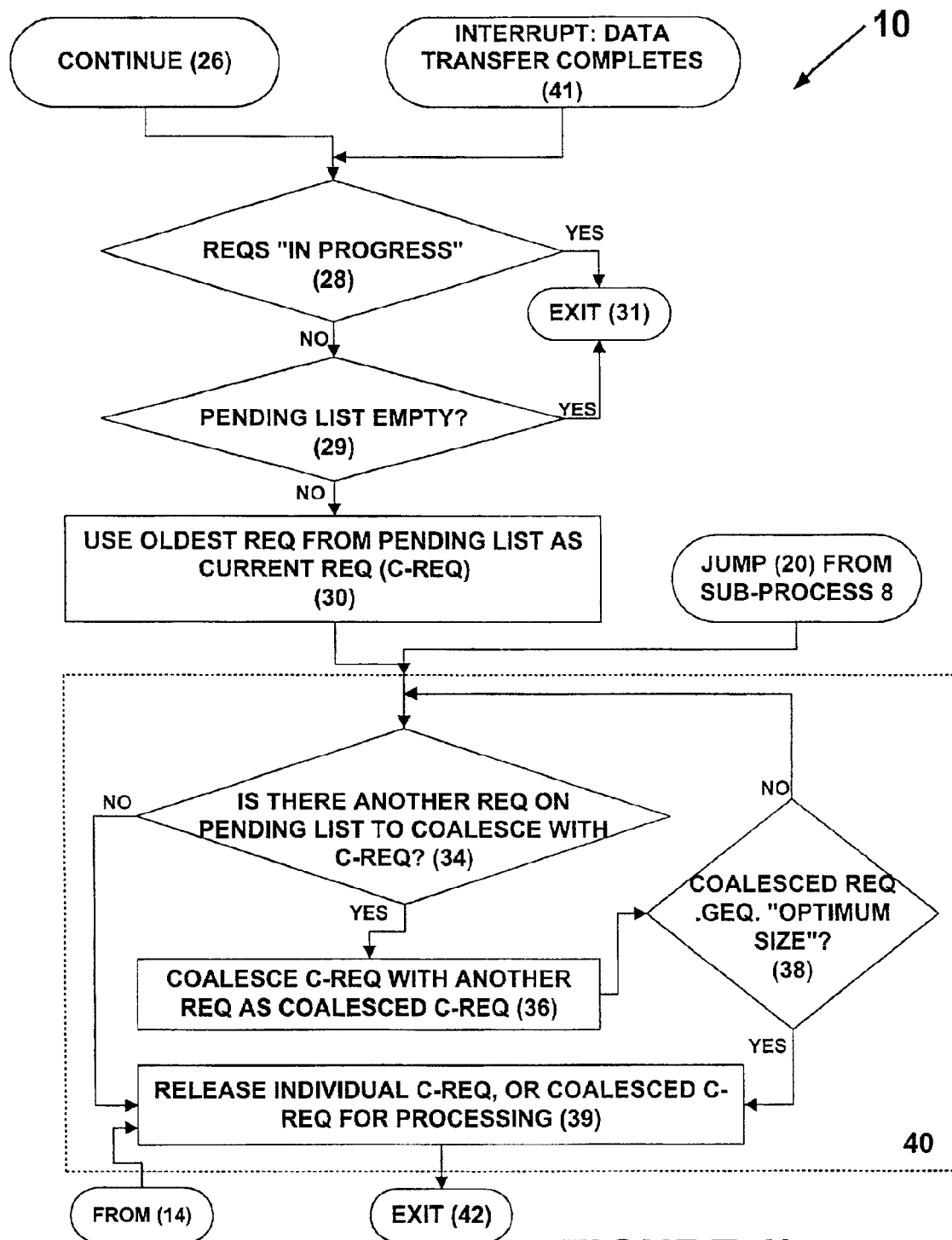
Figure 2:
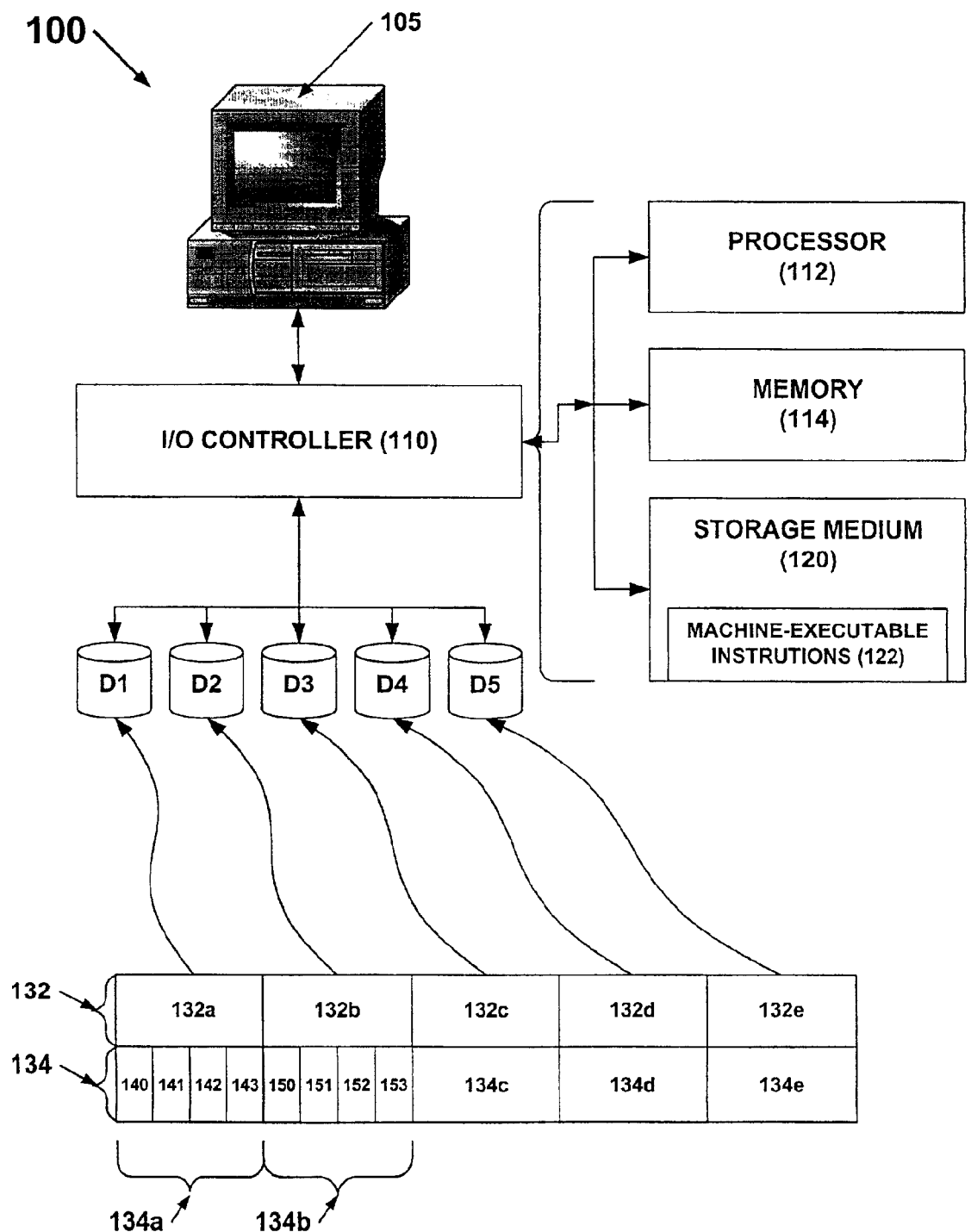
FIG. 2 is a block diagram of computer hardware on which the transaction request coalescing process may be implemented.

Referring to FIGS. 1a and 1b, a process 10 is shown for improving the performance of a computer system by coalescing multiple data transfer requests into combined data transfers. FIG. 2 shows a computer system 100 on which process 10 may be implemented. Computer system 100 includes a personal computer 105, an I/O controller 110 and disk drives D1–D5 connected to the I/O controller. I/O controller 110 includes a processor 112, a memory 114, and a storage medium 120. Storage medium 120 stores machine-executable instructions 122 that are executed by I/O controller 110 to perform transaction coalescing process 10.

Data transfer requests, hereafter referred to as "REQ"s, are reads and writes of data from and to a specific address, or address range, that are sent from computer 105 to I/O controller 110. To coalesce two or more individual REQs the individual REQs must be addressed to adjacent locations that do not overlap. For example, a REQ that specifies an address range of 5 through 10, may only be coalesced with another REQ to an address range that includes 11 and higher, or, an address that include 4 and lower. By coalescing REQs addressed to adjacent locations the number of operations required to transfer the data by I/O controller may be reduced, particularly when the REQs coalesced are addressed to the same physical device, as will be explained.

REQs sent from processor 105 may be addressed to a "logical" address that is then "mapped" by I/O controller 110 to a physical address, or address range, on one or more of the input/output devices, D1–D5. Mapping logical address space to physical addresses and physical devices is sometimes implemented using a "RAID" mapping process. "RAID" refers to a "Redundant Array of Inexpensive Disks", that is, mapping a logical address space to multiple physical devices according to a specific RAID process. Several different RAID mapping processes are available.

Referring to FIG. 2, an exemplary RAID mapping process partitions a "stripe" of data, 132 or 134, into several "strips" of data, 132a–132e and 134a–134e, respectively. Each strip of data, 132a–132e and 134a–134, is mapped to a different physical device, in this case, disks D1–D5, respectively. Furthermore, each strip may contain multiple adjacent sub-blocks of data, for example, strip 134a includes sub-blocks 141–143, and strip 134b includes sub-blocks 150–153. Therefore, if system 100 is using a RAID mapping process, individual REQ's to adjacent sub-blocks within a strip may be coalesced into a combined data transfer. Furthermore, individual REQ's to adjacent sub-block that "cross over" a strip boundary but are within a single stripe may be coalesced into a combined data transfer (As an example, within stripe 134, sub-block 143 in strip 134a is adjacent to sub-block 150 in strip 134b). By combining REQs to adjacent locations into a combined data transfer the performance of the I/O controller 110 and system 100 is improved because fewer data transfers need to be performed.

Process 10 includes, in some cases, a determination whether the combination of REQ's is "Optimum-size". "Optimum-size" refers to the maximum size of a data transfer that may be coalesced based on the address mapping scheme being used by I/O controller 110. For example, in some RAID mapping schemes, an "optimum-size" coalesced read transfer would allow for the coalescing of REQs that address only the sub-blocks within a single strip of data. This is due to the fact that a read transfer that crosses a strip boundary would require separate data transfers for each strip, therefore, combining read transfer requests that cross strip boundaries does not improves system performance. As another example, in some RAID mapping schemes, an "optimum-sized" coalesced write transfer would coalesce REQ's that address adjacent sub-blocks anywhere within an entire stripe of data. This is due to the fact that certain RAID mapping schemes include an Error Correcting Code (ECC) calculation based on the data contained in all of the strips of data within a stripe. Therefore, the ECC calculation is made faster by coalescing any adjacent REQs, even those REQs that address adjacent strips "across" strip boundaries within a stripe, and avoiding having to read those strips being coalesced when performing ECC calculations.

Coalescing process 10 must be able to interact with a variety of different I/O applications that may be executed by a host processor. For example, some I/O applications are configured to "deadlock" waiting for a first REQ to be indicated as complete before sending a subsequent REQ. Other I/O applications are configured to wait a fixed period of time between sending a first REQ and sending a second REQ unless a completion indication is received for the first REQ. Therefore, the host processor will "slowdown" waiting for a coalescing process that is, in turn, waiting for the second REQ to be sent before sending a completion indication for the first REQ. Still other I/O applications will only send a "limited number of outstanding REQ's" and then wait for a completion indication before sending more REQ's (Generally, this "limited number of outstanding REQ's" is not known to the coalescing process). Therefore, to perform efficiently, a coalescing process must be capable of interacting with I/O applications that manage outstanding REQ's differently, that is, I/O applications which might "deadlock", "slowdown" waiting for a completion indication, or only allowing a "limited number of outstanding REQ's".

Referring to FIGS. 1a and 1b, process 10 uses a pending list to store REQs that may be coalesced with subsequent REQs received by system 100. Before a REQ is placed on the pending list, a determination is made as whether a new REQ is "sequential". This "sequential" determination refers to a determination of whether a new REQ is within the address space of the same stripe of data as other REQs on the pending list, or, within the address space of a stripe of data immediately before or after other REQs on the pending list.

Process 10 begins by initializing a variable (not shown) for "queue depth". "Queue depth" refers to the maximum number of REQs that may be stored in the pending list. "Queue depth" may be modified during or between the performance of process 10.

In this embodiment, coalescing process 10 includes two major sub-processes, sub-process 8 (see FIG. 1a) for receiving NEW REQ's and determining whether the NEW REQ should be stored in a pending REQ list or released, and sub-process 40 (see FIG. 1b) that determines whether pending REQs may be coalesced into a combined data transfer and releases REQ's for processing. An interrupt (11) is generated when a NEW REQ is received which causes sub-process 8 to be performed. Sub-process 8 receives (12) the NEW REQ and determines (14) whether the NEW REQ is sequential. If new REQ is determined (14) not sequential, sub-process 8 releases (39) NEW REQ (see FIG. 1b) for processing. If NEW REQ is determined (14) sequential, sub-process 8 determines (16) if the number of REQs stored in the pending list is greater than or equal to the value of "Queue Depth". If it is determined (16) that the number of REQs stored in the pending list is greater than or equal to the value of "Queue Depth", sub-process jumps (20) to sub-process 40, if not, sub-process 8 determines (18) if NEW REQ may be coalesced with another REQ from the pending list to form an "optimum-sized" coalesced REQ. If it is determined that NEW REQ may be coalesced with another REQ from the pending list, sub-process 8 jumps (20) to sub-process 40, if not, sub-process 8 stores (24) NEW REQ in the pending list and continues (26) the performance of process 10 (see FIG. 1b).

Process 10 may also be begun by an interrupt (41) (see FIG. 1b). Interrupt (41) is generated whenever a previously released data transfer has been completed by I/O controller 110. In either case, continuation (26) or interrupt (41), process 10 next determines (28) whether previous REQs are "in progress", i.e., one or more previous REQs are causing I/O controller 110 to send or receive data, or perform parity or ECC calculations, etc. If process 10 determines (28) that there are REQs in progress, process 10 exits (31). If there are no previous REQs in progress, process 10 determines (29) whether the pending list is empty. If the pending list is empty, process 10 exits (31). If the pending list is not empty, process 10 uses (30) the oldest REQ from the pending list as the C-REQ and begins sub-process 40. The determinations (28) and (29), enable process 10 to avoid the indefinite storing of REQs on the pending list. That is, each time a data transfer completes (41), process 10 will perform the release and combination sub-process 40 whenever no other REQs are in progress and there are any pending REQs on the pending list. Therefore, process 10 avoids the potential problems related to I/O applications that may "deadlock", "slowdown" and/or "limit the number of outstanding REQ's".

Sub-process 40 may also be started when sub-process 8 jumps (20) to sub-process 40 and sets NEW REQ as C-REQ.

Sub-process 40 determines (34) whether there is another REQ from the pending list to coalesce with C-REQ. If there is not another REQ to coalesce with C-REQ, C-REQ is released (39) for processing. If there is another REQ from the pending list to coalesce with C-REQ, sub-process 40 coalesces (36) C-REQ and the REQ from the pending list into a COALESCED C-REQ, and determines (38) whether the COALESCED C-REQ is "optimum-sized", if the coalesced REQ is determined to be "optimum-sized", COALESCED CREQ is released (39) for processing. If process 10 determines (38) that the COALESCED REQ is not "optimum-sized", sequence of actions (34), (36) and (38) are repeated. Following the release (39) of C-REQ or COALESCED CREQ, sub-process 40 exits (42).

Process 10 uses a pending list to store previously received REQs. In some cases, the pending list allows coalescing of adjacent REQs that are received "out of order". For example, a first REQ (REQ1) to address 1 is received and stored on the pending list, then a second REQ (REQ2) to address 3 (that is not adjacent to address 1) is received and stored on the pending list. If a third REQ (REQ3) to address 2 is received before process 10 determines (28) that no other REQs are in progress, the "out of order" REQ3 to address 2, can be coalesced into a single transfer with REQ1 to address 1 and REQ2 to address 3.

Figure 3:
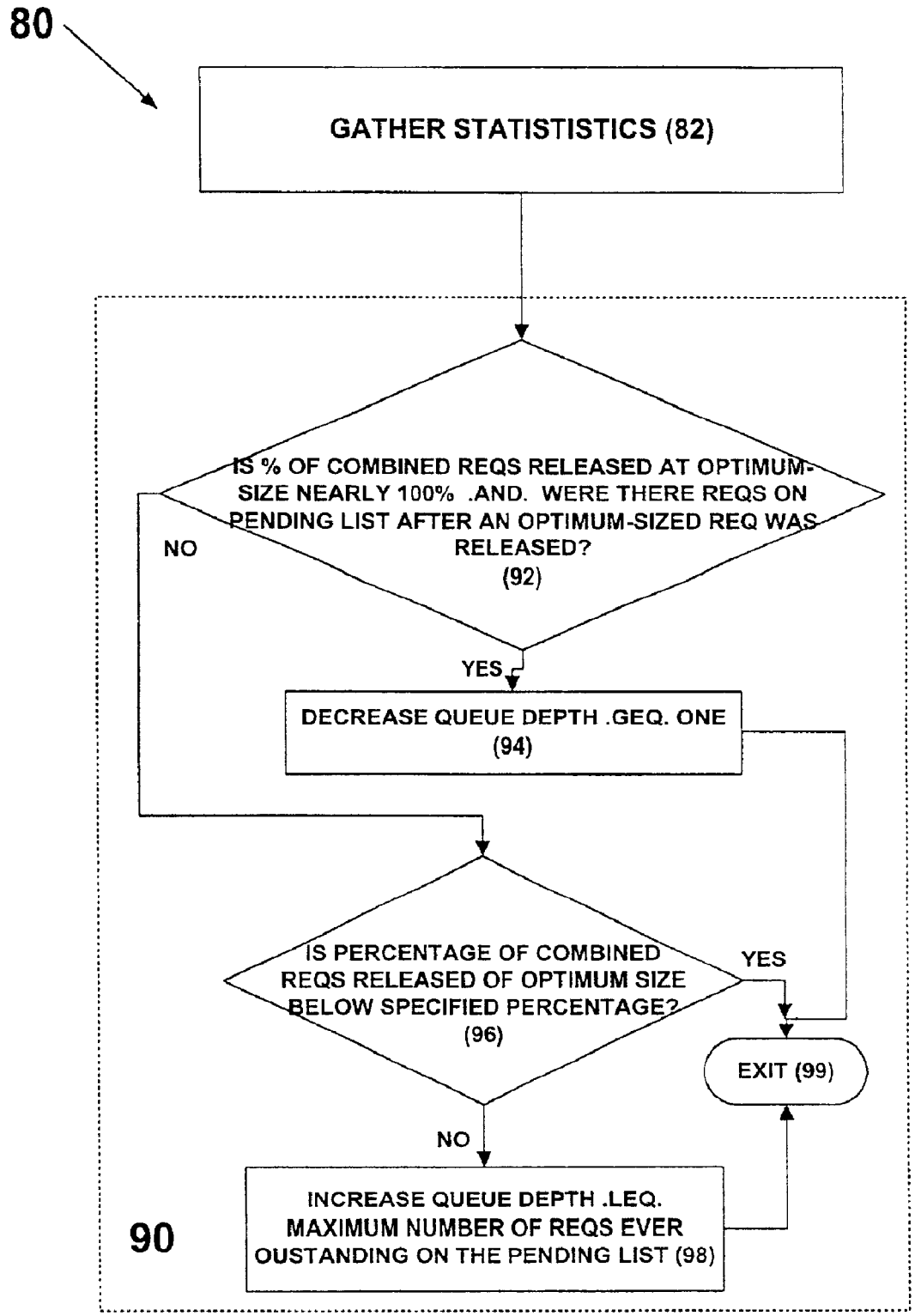
FIG. 3 is a flowchart showing a queue depth adjustment process.

FIG. 3 shows a process 80 that includes features that may be added as part of process 10. During or following each performance of process 10, process 80 gathers (82) statistics that relate to coalescing operations performed by process 10. Gathering (82) statistics may include gathering data that indicates the percentage of REQ's released that were of "optimum-size" and may also include data that indicates the largest number of REQ's that were ever pending on the pending list.

Process 80 also includes a "queue depth" adjustment routine 90 that uses the gathered (82) statistics to determine whether to increase or decrease the "queue depth" variable. Adjustment process 90 decreases (94) the queue depth if it determines 92 that the percentage of coalesced REQs released at the optimum-size is nearly 100% (that is, within a specified percentage of 100% that is set by a programmer or a user of routine 90) and there were REQs on the pending list after an optimum-sized coalesced REQ was released. Decrease (94) of "queue-depth" is limited to be greater than or equal to one. Otherwise, routine 90 increases (98) the queue depth if it determines (96) that the percentage of coalesced REQs released of optimum-size is below a specified percentage (the specified percentage being set by a programmer or user of process 10). Increase (98) of "queue depth" is limited to an increase that is less than or equal to the maximum number of REQs that were ever stored on the pending list. Following a decrease (94) or increase (98) to queue depth, sub-process 90 exits (99).

Adjustment process 90 may be executed at any time, that is, following or during coalescing process 10.

Process 10 is not limited to use with the hardware and software of FIG. 2. It may find applicability in any computing or processing environment. Process 10 may be implemented in hardware, software, or a combination of the two. Process 10 may be implemented in computer programs executing on programmable computers or other machines that each include a processor, a storage medium readable by the processor (including volatile and non-volatile memory and/or storage components), at least one input device, and one or more output devices. I/O controller 110 may be included as a part of computer 105, that is, as part of the same integrated processor or as part of the same computer chassis, and may share the processor 112, memory 114 and/or storage medium 120. Machine-executable can also be executed from a ROM or they can be moved from ROM to memory 114 and run from there. Coalescing process 10 can be performed by computer 105 before a REQ is sent to I/O controller 110. Each such program may be implemented in a high level procedural or object-oriented programming language to communicate with a computer system. However, the programs can be implemented in assembly or machine language. The language may be a compiled or an interpreted language.

Each computer program may be stored on a storage medium/article (e.g., CD-ROM, hard disk, a ROM, or magnetic diskette) that is readable by processor 112 or computer 105 for configuring and operating computer system 100 when the storage medium or device is read by processor 112 or computer 105 to perform process 10. Process 10 may also be implemented as a machine-readable storage medium, configured with a computer program, where, upon execution, instructions in the computer program cause a machine to operate in accordance with process 10. It is also possible to store the program in a ROM on the I/O controller 110.

The invention is not limited to the specific embodiments described above. For example, logical to physical address mapping to multiple physical devices was mentioned. However, a single physical device, such as a magnetic tape drive, could be logically to physically mapped, that is, mapping different physical locations on the tape media to logical address space. Furthermore, process 10 may also be used even when no address mapping scheme is being used. We also mentioned "read" and "write" commands as example of data transfer requests. However, "reads" and "write" commands could be more complex commands such as a "write with verify", etc. We mentioned the definition of "sequential" as including only those stripes of data immediately before or after another stripe of data referenced by a REQ stored in the pending list. However, this definition of "sequential" could be expanded to include a larger range of data stripes before and after a stripe referenced by a REQ stored in the pending list.

In an alternate embodiment, the action of determining (28) that no REQs are in progress could be eliminated from process 10 (see FIG. 1b). In more detail, coalescing process 10 could process and release any pending REQs from the pending list every time a previous data transfer has completed, regardless of whether there are any REQs in progress. In this embodiment, the possibility of stalling a computer 105 for an indefinite time would be avoided since transfer REQs would be continuously released after every previous data transfer completes.

Other embodiments not described herein are also within the scope of the following claims.

What is claimed is:

1. A method of transferring data within a computer system, comprising:
   completing a first data transfer;
   determining that no data transfers are being processed;
   using a computer for coalescing two or more transfer requests into a second data transfer; and
   releasing the second data transfer for processing.

2. The method of claim 1, further comprising:
   determining there are pending transfer request to coalesce before releasing the second data transfer.

3. The method of claim 2, further comprising:
   storing pending transfer requests, and
   determining that the number of pending transfer requests stored is not greater than a queue depth variable before storing a new transfer request.

4. The method of claim 2, wherein a second transfer request is stored on a pending list, and
   wherein the second transfer request is not addressed adjacent to the first transfer request address, and
   wherein a third transfer request is coalesced with the first and second transfer requests into the second data transfer, the third transfer request being adjacent to the first and second transfer requests.

5. The method of claim 2, wherein releasing comprises determining that the second data transfer is an optimun-size that corresponds to an address boundary of an input/output device.

6. The method of claim 5, wherein the address boundary corresponds to a strip boundary corresponding to a redundant array of inexpensive disks (RAID) process.

7. The method of claim 6, further comprising:
   gathering performance statistics based on at least one of a number of optimum-size transfers and a largest number of pending requests; and
   modifying the queue depth variable based on the gathered statistics.

8. A method of transferring data within a computer system, comprising:
   receiving transfer requests;
   releasing data transfers for processing;
   using a computer system coalescing two or more transfer requests into an additional data transfer; and
   releasing the additional data transfer for processing each time a first data transfer completes.

9. The method of wherein releasing the combined data transfer comprises determining that the additional data transfer is an optimum-size that corresponds to an address boundary of an input/output device.

10. The method of claim 8, further comprising:
    determining there are pending transfer requests, wherein the additional data transfer comprises two or more transfer requests.

11. The method of claim 10, further comprising:
    determining there are pending transfer requests to coalesce before releasing the additional data transfer.

12. An article comprising a machine-readable medium that stores machine-executable instructions for transferring data, the instructions causing a machine to:
    release a first data transfer for processing;
    complete a first data transfer;
    determine that no data transfers are being processed;
    combine two or more transfer requests into a second data transfer; and
    release the second data transfer for processing.

13. The article of claim 12, wherein instructions causing a machine to release comprises instructions causing a machine to determine that the second data transfer is an optimum-size that corresponds to an address boundary of an input/output device.

14. The article of claim 13, wherein the address boundary corresponds to a strip boundary corresponding to a redundant array of inexpensive disks process.

15. The article of claim 13, further comprising instructions causing a machine to:
    store pending transfer requests; and
    determine that the number of pending transfer requests stored is not greater than a queue depth variable before storing a new transfer request.

16. The article of claim 15, further comprising instructions causing a machine to:
    gather performance statistics corresponding based on at least one of a number of optimum-size transfers and a largest number of pending requests; and
    modify the queue depth variable based on the gathered statistics.

17. An apparatus for coalescing transfer requests, comprising:

a memory that stores executable instructions; and a processor that executes the instructions to:
- release a first data transfer for processing;
- complete a first data transfer;
- determine that no data transfers are being processed;
- combine two or more transfer requests into a second data transfer; and
- release the a second data transfer for processing.

18. The apparatus of claim 17, wherein the processor executes instructions to:

determine there are no pending transfer requests to coalesce before releasing the second data transfer.

19. The apparatus of claim 18, wherein releasing comprises determining that the second data transfer is an optimum-size that corresponds to an address boundary of an input/output device.

20. The apparatus of claim 19, wherein the address boundary corresponds to a strip boundary corresponding to a redundant array of inexpensive disks process.

21. The apparatus of claim 19, wherein the processor executes instructions to:

store pending transfer requests; and determine that a number of stored transfer requests is not greater than a queue depth variable before storing a new transfer request on the pending list.

22. The apparatus of claim 19, wherein the processor executes instructions to:

gather performance statistics based on at least one of a number of optimum-size transfers and a largest number of pending requests; and modify the queue depth variable based on the gathered statistics.

23. The apparatus of claim 22, wherein the processor executes instructions to, store a second transfer request on the pending list, wherein the second transfer request is not addressed adjacent to the first transfer request address; and coalesce a third transfer request with the first arid second transfer requests into the second data transfer, the third transfer request being adjacent to the first end second transfer requests.

* * * * *